United States Patent

Zanetti

Patent Number: 5,878,774
Date of Patent: Mar. 9, 1999

[54] TYRE INFLATION GUN

[75] Inventor: Paolo Zanetti, Congeliano, Italy

[73] Assignee: Walmec S.p.A., Milano, Italy

[21] Appl. No.: 51,798

[22] PCT Filed: Sep. 30, 1996

[86] PCT No.: PCT/EP96/04267

§ 371 Date: Apr. 23, 1998

§ 102(e) Date: Apr. 23, 1998

[87] PCT Pub. No.: WO97/15478

PCT Pub. Date: May 1, 1997

[30] Foreign Application Priority Data

Oct. 23, 1995 [IT] Italy ................................ VE95A0041

[51] Int. Cl.⁶ ............................ F16K 11/16; B60S 5/04
[52] U.S. Cl. ......................... 137/228; 137/229; 73/146.8
[58] Field of Search .................................. 137/227, 228,
137/229, 627.5, 630.22; 152/415; 73/146.3, 146.8

[56] References Cited

U.S. PATENT DOCUMENTS

| 229,023 | 1/1880 | Amneus | 137/228 |
|---|---|---|---|
| 1,420,997 | 6/1922 | Freeman | 73/146.8 X |
| 1,495,679 | 5/1924 | Donaldson | 137/228 |
| 1,666,283 | 4/1928 | Farley | 137/229 |
| 1,781,121 | 11/1930 | Mc Farland | 137/228 |
| 1,834,033 | 12/1931 | Michelin | 137/228 |
| 1,933,610 | 11/1933 | Wahl | 137/228 |
| 1,981,586 | 11/1934 | Crowley | 137/228 |
| 2,001,233 | 5/1935 | Anderberg | 137/228 |
| 2,039,638 | 5/1936 | Druge et al. | 137/454.5 |
| 2,173,619 | 9/1939 | Ames | 137/229 X |
| 2,296,622 | 9/1942 | Wehe | 137/229 |
| 2,635,623 | 4/1953 | Moffett | 137/229 |
| 4,116,245 | 9/1978 | Ayers | 73/146.3 X |
| 4,424,831 | 1/1984 | Nugent | 137/627.5 |
| 4,658,869 | 4/1987 | Soon-Fu | 137/227 X |

*Primary Examiner*—John Rivell
*Assistant Examiner*—Meredith H. Schoenfeld
*Attorney, Agent, or Firm*—Hoffman, Wasson & Gitler

[57] ABSTRACT

A tire inflation gun has a valve having several positions. When fully closed, the gun does not fill or empty a tire, but allows the tire pressure to be measured. When the valve is partially opened, the tire pressure can still be measured, but air is allowed to escape from the tire. Fully open, the gun allows the tire to be filled by a pressurized air source but closes the connection between pressure gauge and pressurized air source. This prevents the pressure gauge from being damaged by the high pressure.

9 Claims, 4 Drawing Sheets

TYRE INFLATION GUN

BACKGROUND OF THE INVENTION

The invention relates to a tire inflation gun.

Tire inflation guns are known in the art. They generally comprise a gun structure connected by a pipe to a compressed air receiver and extend into a tube provided with an element for its connection to a tire nozzle. A pressure gauge is connected to the gun structure for checking the tire pressure.

The inflation gun is used by connecting the gun to the tire, the pressure gauge then indicating the tire pressure. If the internal pressure is less than the correct value, the user operates the gun trigger to connect the compressed air receiver to the tire and hence inflate it. If the internal pressure is too high, the user causes air to escape from the tire by again operating the trigger, but moving it only a short distance.

However, this known inflation gun has the drawback that, during inflation, the pressure gauge is connected to the compressed air receiver, with consequent damage to the sensor element and to the pointer of the pressure gauge graduated scale, which has an end-of-scale value which is distinctly less than the pressure in the receiver.

An object of the invention is to eliminate this drawback by providing an inflation gun which, during tire inflation, closes the connection between the pressure gauge and the compressed air receiver.

It is another object of the invention to provide a tire inflation gun allowing a tire to be inflated or deflated and measure the pressure within the tire. It is another object of the invention to provide a valve that may be used in a tire inflation device that allows the tire to be deflated while measuring the pressure in the tire but protects the pressure gauge from exposure to high pressure during tire inflation.

SUMMARY OF THE INVENTION

The tire inflation gun has three chambers; one communicates with the pressurized air supply, a second leads to a tube that can be connected to a tire and the third communicates with the pressure gauge. A valve separates the first chamber from the second and third. The valve has a first valve body in a valve seat and a second valve body within a through-bore of the first valve body. A trigger engages the head of the second valve body to move it axially. When moved a small distance, air is allowed to flow from the second chamber into the through-bore and passed the second valve body to the atmosphere. When the trigger is fully depressed, the second valve body head engages the first valve body thereby sealing the through-bore and raising the first valve body. As this occurs, the first chamber is in fluid communication with the second chamber but the third chamber is sealed from the pressurized air supply.

BRIEF DESCRIPTION OF THE DRAWINGS

A preferred embodiment of the invention is described in detail hereinafter by way of non-limiting embodiment with reference to the accompanying drawings, in which.

DETAILED DESCRIPTION OF THE INVENTION

Figure 1:
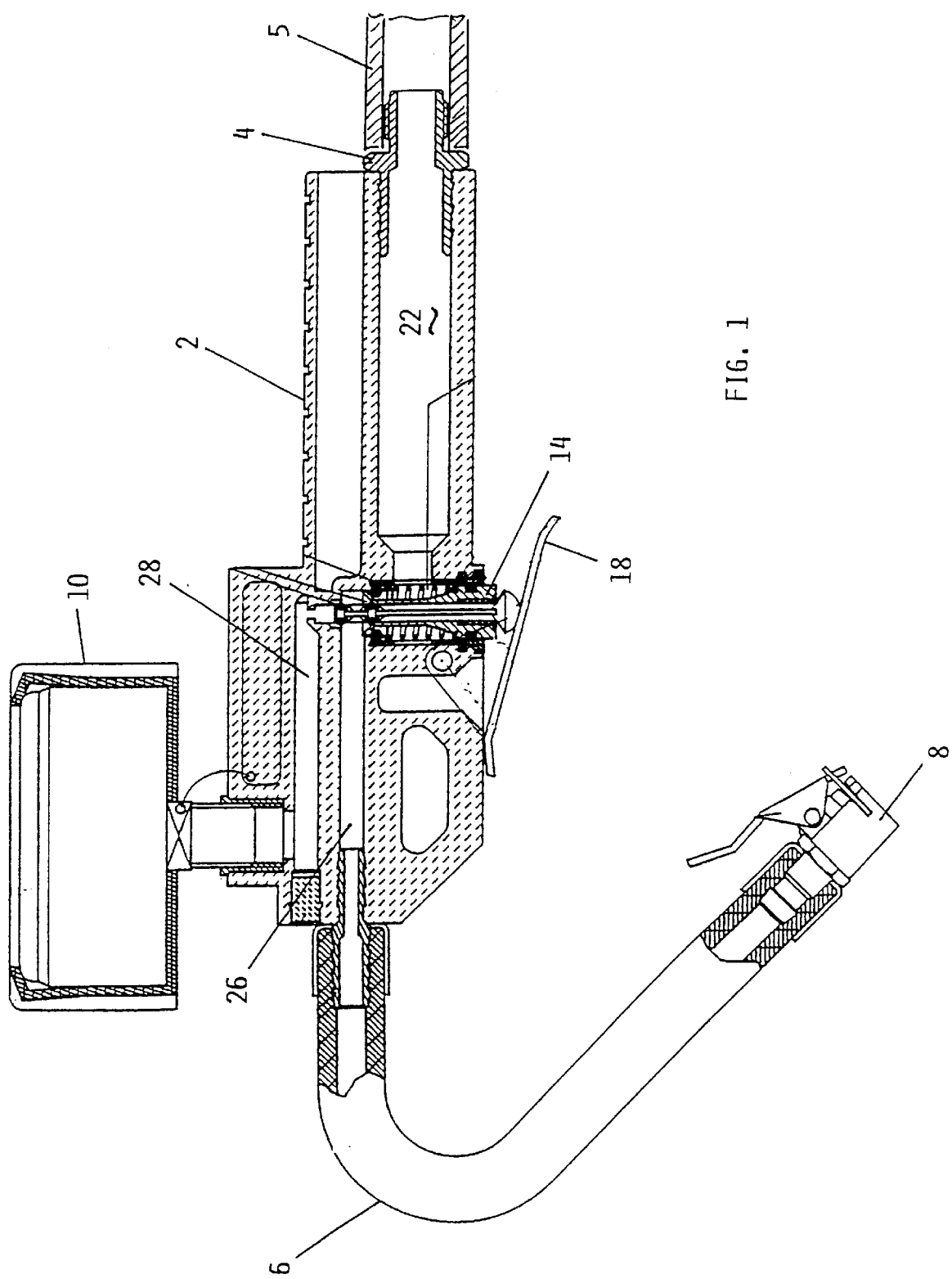
FIG. 1 is a longitudinal section through a gun according to the invention.

As can be seen from the figures, the inflation gun according to the invention, comprises a gun structure 2 provided with a threaded insert 4 for connection to the pipe 5 of the compressed air receiver and a tube 6 provided with an element 8 for connection to the tire nozzle. A pressure gauge 10 is also mounted on the gun structure.

Within the gun structure, there is provided a cylindrical seat 12 for a valving element indicating overall by 14. The cylindrical seat 12 for the valving element 14 comprises a first aperture 16 provided at one end facing a trigger 18 hinged to the gun structure. In a substantially central position in the seat, there is a second aperture 20 which connects the seat to a chamber 22 connected to the compressed air pipe 5. The seat comprises a third aperture 24 for connecting the seat to a chamber 26 communicating with the tube 6 and to a chamber 28 communicating with the pressure gauge 10.

Coaxially with the valving element 14, there is provided a coil spring 30 which, in the absence of external stresses, maintains the head 32 of the valving element 16 in contact with seal gaskets provided in correspondence with the aperture 24. The valving element 14 comprises a central longitudinal hole 36 in which a second valving element 38 is axially movable, its stem 40 being substantially of cross-shaped cross-section and being provided with two heads 42, 44 with which 0-rings 46 are associated. The other end of the stem 40 is provided with a prismatic shaped head 48. The prismatic head 48 has a conical shaped portion facing the valving element with its lateral surface complementary to a corresponding annular recess 50 provided in the valving element 14.

Coaxially with the stem 40, there is a coil spring 52 having a spring constant less than that of the spring 30 and which, in the absence of external stresses, maintains the prismatic head 48 spaced from the recess 50 and in contact with the trigger 18.

The valving element 38 is movable between two end positions. In the first position, the head 44 closes the upper aperture of the hole 36, and in the second the head 42 closes the aperture 54 which communicates with the duct 28 of the pressure gauge 10.

Figure 2:
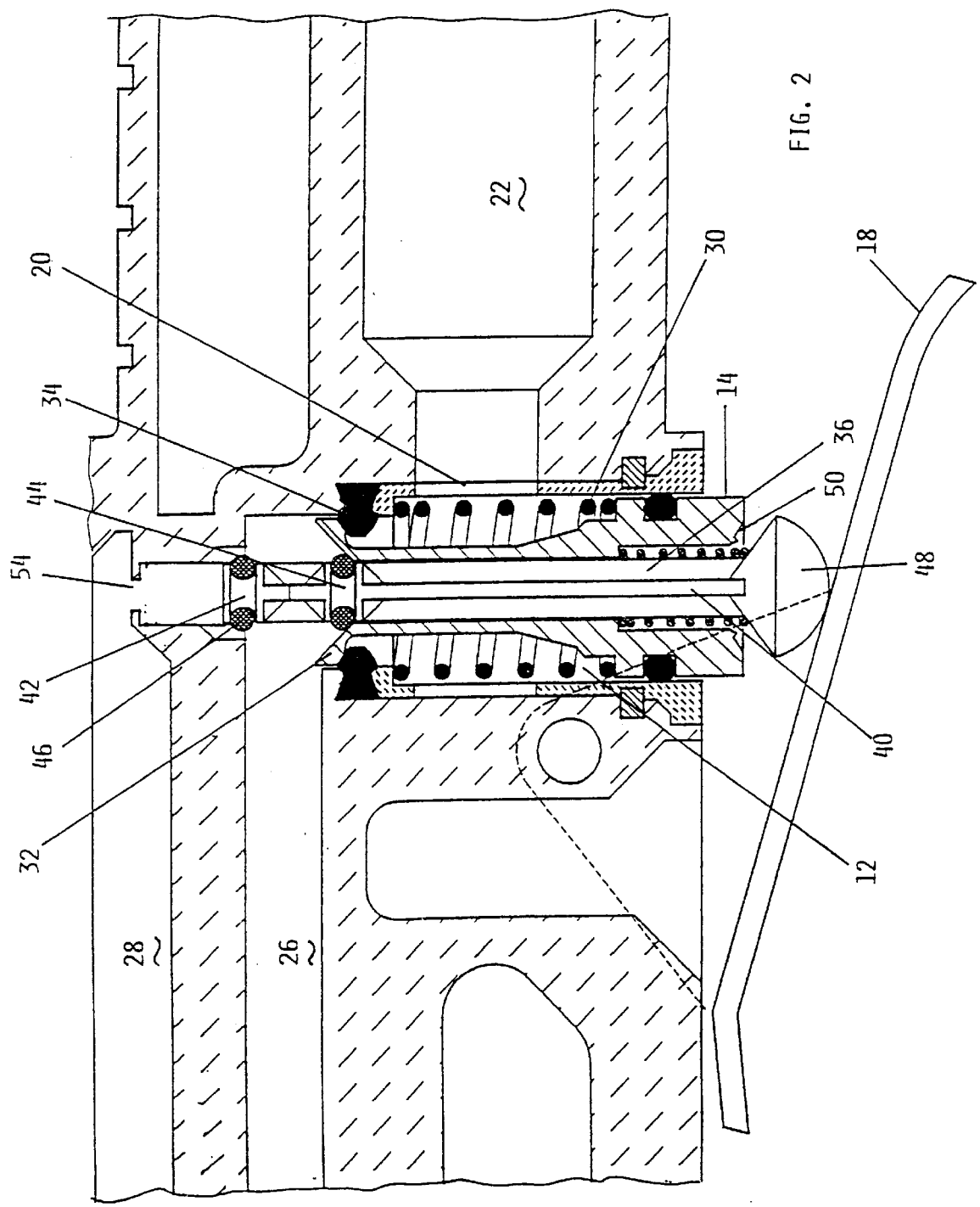
FIG. 2 is an enlarged detailed view of the operating valve when checking the tire pressure.

The gun, according to the invention, operates as follows:

Under normal conditions, the coil spring 30 maintains the head 32 in a position in which it closes the aperture 24, the coil spring 52 maintaining the stem 40 with its head 44 in a position in which it closes the hole 36 and its head 42 spaced from the aperture 54. The chamber 26 communicates with the chamber 28 connected to the pressure gauge. In this configuration, the prismatic head 48 of the stem 40 is substantially in contact with the trigger 18 (see FIG. 2).

At the moment in which the user applies the end 8 of the tube 6 to the wheel nozzle, the internal tire pressure is indicated by the pressure gauge by virtue of the direct connection between the chamber 26 and the chamber 28. If the indicated pressure is less than the correct pressure, the user operates the trigger 18 to initially cause the stem 40 to move within the hole 36 in the valving element 30 and then, when the conical surface makes contact with the corresponding facing surface 50 of the valving element 14, to raise the latter.

Figure 3:
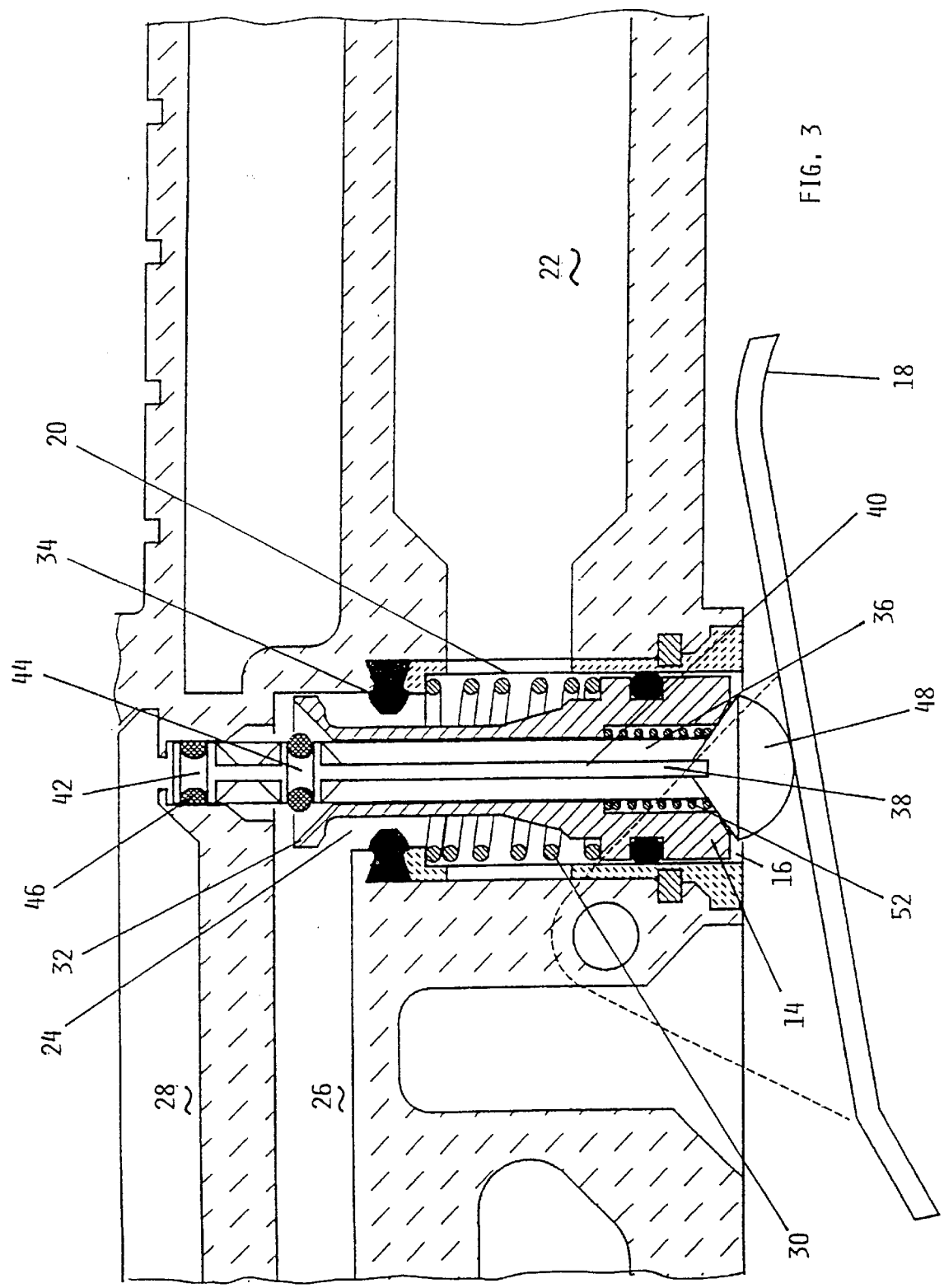
FIG. 3 shows the operating valve in the same view as FIG. 3 during tire inflation.

As a result of the movement of these two valving elements, the chamber 28 is closed by the head 42 of the stem 40 when the trigger is depressed, the hole 36 in the valving element 14 is opened with consequent air flow from the chamber 22 through the seat 12, then into the chamber 26 and hence to the tire (see FIG. 3).

Figure 4:
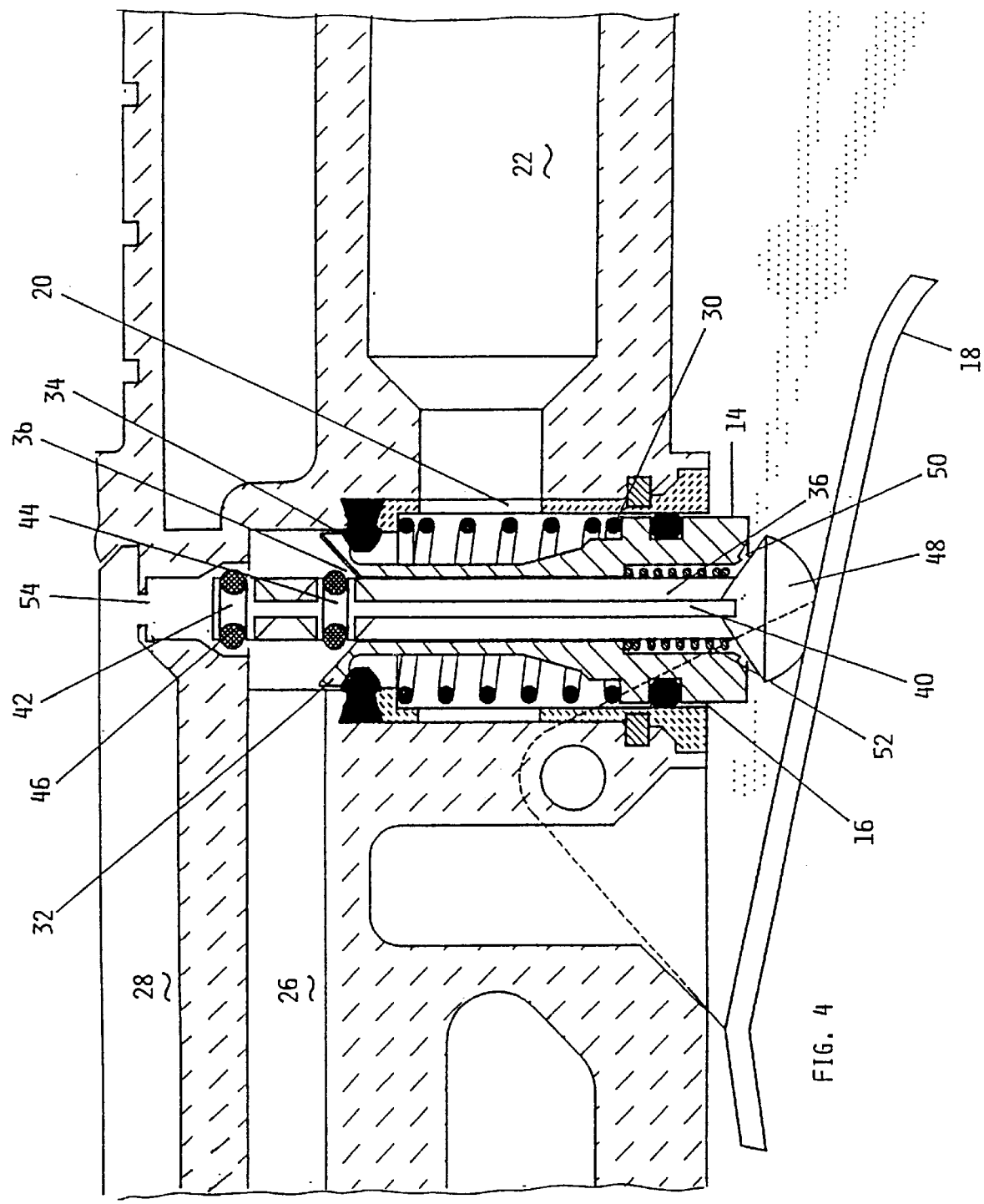
FIG. 4 shows the operating valve during deflation.

If the internal tire pressure is greater than the correct value, the user operates the trigger 18 lightly so as to axially thrust the stem 40 but without the prismatic head 48 coming into contact with the valving element 14. This movement of the rod causes the head 44 to separate from the valving element 14 with consequent escape of air from the tire via the chamber 26, the hole 36 and the bottom end of the valving element 14. In this configuration, the upper head 42 of the rod 40 does not close the aperture 54 with the result that, via the chamber 26, the pressure gauge communicates with the tire, to indicate the pressure within this latter (see FIG. 4).

I claim:

1. A valve assembly comprising:
   a valve seat having at least one side wall, said valve seat having a first end having an aperture and a second end having an aperture, said at least one side wall having a third aperture,
   a first valve body having a valve head for closing said valve seat second end aperture and a through bore having a first and second end extending through said first valve body,
   a first biasing member extending between said valve seat and said first valve body for biasing said first valve body downward,
   a second valve body extending through said first valve body through bore, said second valve body having a valve stem having a first and second end, a first valve head attached to said valve stem first end and located below said through bore first end, a second valve head attached to said valve stem for sealing said through-bore second end and a third valve head attached to said valve stem and located above said second valve head,
   a second biasing member extending between the first valve body and second valve body for biasing said second valve body downward.

2. A valve assembly according to claim 1, wherein the bottom of the first valve body has a recess having a shape that is complementary to the top of said second valve body's first head.

3. A valve assembly according to claim 1, wherein said first biasing member has a spring constant that is greater than the spring constant of the second biasing member.

4. A valve assembly according to claim 1, wherein said first and second biasing members are coil springs.

5. A tire inflation device comprising:
   a gun structure having a first chamber for communication with a pressurized air supply, a second chamber for communicating with a tire and a third chamber for communicating with a pressure gauge,
   a valve assembly between said first chamber and the second and third chambers, the valve assembly comprising:
      a valve seat having at least one side wall, said valve seat having a first end having an aperture and a second end having an aperture, said at least one side wall having a third aperture,
      a first valve body having a valve head for closing said valve seat second end aperture and a through bore having a first and second end extending through said first valve body,
      a first biasing member extending between said valve seat and said first valve body for biasing said first valve body downward,
      a second valve body extending through said first valve body through-bore, said second valve body having a valve stem having a first and second end, a first valve head attached to said valve stem first end and located below said through bore first end, a second valve head attached to said valve stem for sealing said through bore second end and a third valve head attached to said valve stem and located above said second valve head,
      a second biasing member extending between the first valve body and second valve body for biasing the second valve body downward.

6. The tire inflation device of claim 5, further comprising a trigger for contacting said second valve body first head.

7. The tire inflation device of claim 5, wherein the three chambers are parallel.

8. The tire inflation device of claim 5, wherein said first and second biasing members are coil springs.

9. The tire inflation device of claim 5, wherein said first biasing member has a spring constant that is greater than the spring constant of said second biasing member.

* * * * *